(12) United States Patent
Teken et al.

(10) Patent No.: US 11,027,489 B2
(45) Date of Patent: Jun. 8, 2021

(54) CONSUMPTION OF MATERIAL IN ADDITIVE MANUFACTURE

(71) Applicant: Stratasys Ltd., Rehovot (IL)

(72) Inventors: Avraham Teken, Gan-Yavne (IL); Boris Belocon, Rehovot (IL)

(73) Assignee: Stratasys Ltd., Rehovot (IL)

( * ) Notice: Subject to any disclaimer, the term of this patent is extended or adjusted under 35 U.S.C. 154(b) by 193 days.

(21) Appl. No.: 15/772,066

(22) PCT Filed: Oct. 27, 2016

(86) PCT No.: PCT/IL2016/051158
§ 371 (c)(1),
(2) Date: Apr. 29, 2018

(87) PCT Pub. No.: WO2017/072766
PCT Pub. Date: May 4, 2017

(65) Prior Publication Data
US 2018/0319083 A1    Nov. 8, 2018

Related U.S. Application Data

(60) Provisional application No. 62/247,785, filed on Oct. 29, 2015.

(51) Int. Cl.
*B29C 64/343* (2017.01)
*G06Q 50/04* (2012.01)
(Continued)

(52) U.S. Cl.
CPC .......... *B29C 64/343* (2017.08); *B29C 64/112* (2017.08); *B29C 64/393* (2017.08);
(Continued)

(58) Field of Classification Search
CPC ... B29C 64/343; B29C 64/112; B29C 64/393; G06Q 10/06; G06Q 10/06313; B33Y 10/00; B33Y 30/00; B33Y 50/02
See application file for complete search history.

(56) References Cited

U.S. PATENT DOCUMENTS

2006/0127153 A1\* 6/2006 Menchik ............... B29C 64/336
400/62
2015/0290880 A1   10/2015 Cudak et al.
(Continued)

FOREIGN PATENT DOCUMENTS

JP     2014-533613      12/2014
JP     2015/078777      4/2015
(Continued)

OTHER PUBLICATIONS

Notice of Reason for Rejection dated Mar. 27, 2020 From the Japan Patent Office Re. Application No. 2018-521923 and Its Translation Into English. (8 Pages).
(Continued)

*Primary Examiner* — Galen H Hauth

(57) ABSTRACT

A method for carrying out additive manufacture while regulating material consumption, comprises making a digital representation of at least part of an object for printing, the representation comprising a plurality of voxels, and then identifying voxels which are flexible in respect of being able to consist of any one of at least two available materials. A balanced material consumption policy is then used to choose between the available materials so as to ensure that as far as possible, different materials are evenly used and wastage is minimized. Finally the object is printed with the selected materials.

18 Claims, 5 Drawing Sheets

(51) Int. Cl.
*G06Q 10/06* (2012.01)
*B29C 64/112* (2017.01)
*B29C 64/393* (2017.01)
*B33Y 10/00* (2015.01)
*B33Y 30/00* (2015.01)
*B33Y 50/02* (2015.01)

(52) U.S. Cl.
CPC ....... *G06Q 10/06* (2013.01); *G06Q 10/06313* (2013.01); *G06Q 50/04* (2013.01); *B33Y 10/00* (2014.12); *B33Y 30/00* (2014.12); *B33Y 50/02* (2014.12); *Y02P 90/30* (2015.11)

(56) References Cited

U.S. PATENT DOCUMENTS

| | | | | |
|---|---|---|---|---|
| 2016/0151979 | A1* | 6/2016 | Urban | G06T 19/20 264/308 |
| 2018/0117856 | A1* | 5/2018 | Ochi | B33Y 10/00 |

FOREIGN PATENT DOCUMENTS

| | | |
|---|---|---|
| JP | 2016-198896 | 12/2016 |
| WO | WO 2004/044816 | 5/2004 |
| WO | WO 2013/072874 | 5/2013 |
| WO | WO 2015/111059 | 7/2015 |
| WO | WO 2017/072766 | 5/2017 |

OTHER PUBLICATIONS

Office Action dated Dec. 24, 2019 From the Israel Patent Office Re. Application No. 259014 and Its Translation Into English. (5 Pages).
International Preliminary Report on Patentability dated May 11, 2018 From the International Bureau of WIPO Re. Application No. PCT/IL2016/051158. (8 Pages).
International Search Report and the Written Opinion dated Dec. 15, 2016 From the International Searching Authority Re. Application No. PCT/IL2016/051158. (11 Pages).
Notice of Reason for Rejection dated Dec. 8, 2020 From the Japan Patent Office Re. Application No. 2018-521923 and Its Translation Into English. (5 Pages).
Communication Pursuant to Article 94(3) EPC dated Apr. 9, 2020 From the European Patent Office Re. Application No. 16798005.1. (5 Pages).
Notification of Office Action dated Mar. 3, 2021 From the China National Intellectual Property Administration, CNIPA Re. Application No. 201680070901.5 and Its Summary in English. (10 Pages).
Office Action dated Feb. 8, 2021 From the Israel Patent Office Re. Application No. 259014 and Its Translation Into English. (5 Pages).
Translation dated Mar. 26, 2021 of Notification of Office Action dated Mar. 3, 2021 From the China National Intellectual Property Administration, CNIPA Re. Application No. 201680070901.5. (5 Pages).

* cited by examiner

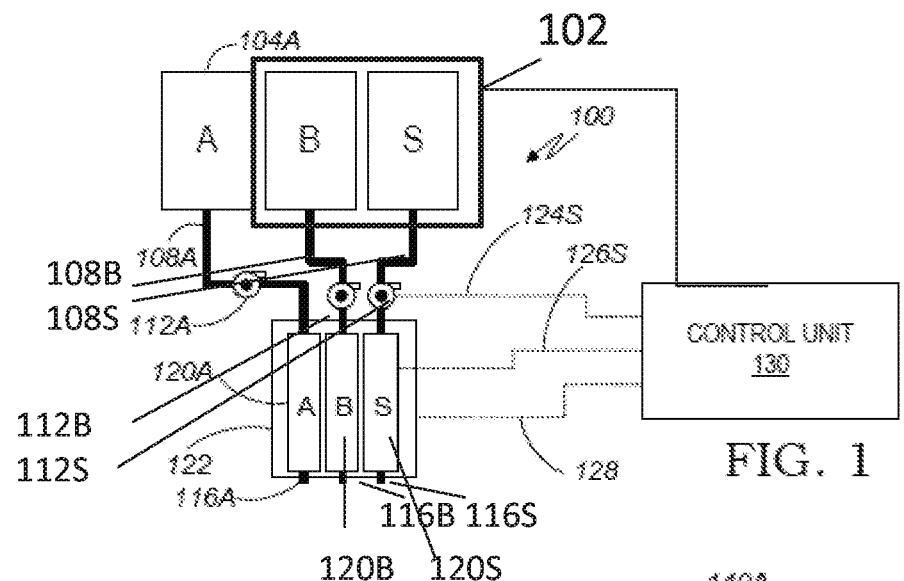
FIG. 1
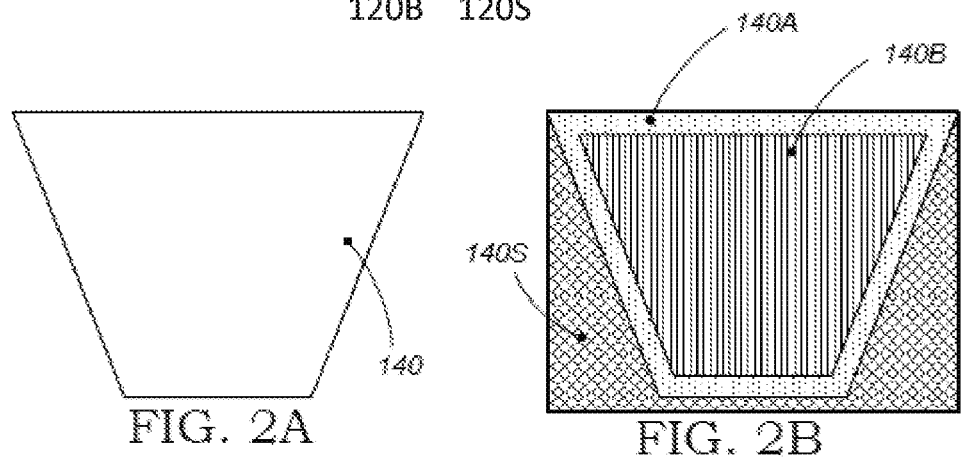
FIG. 2A
FIG. 2B
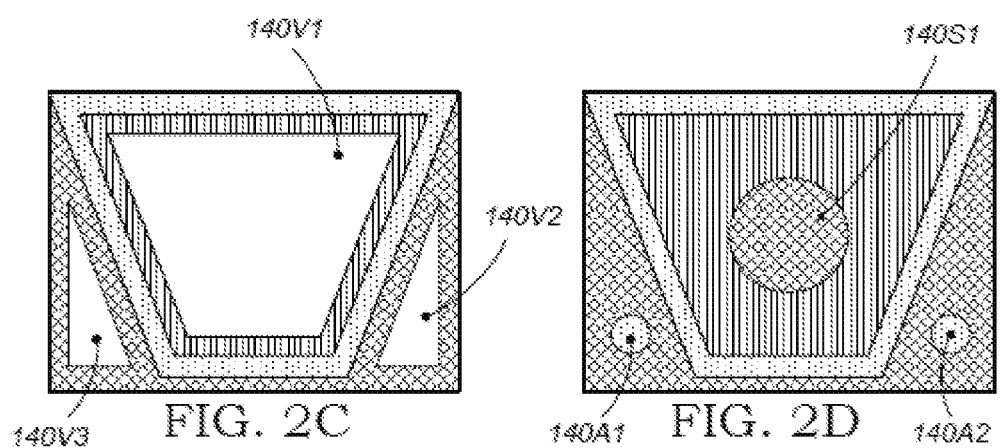
FIG. 2C
FIG. 2D

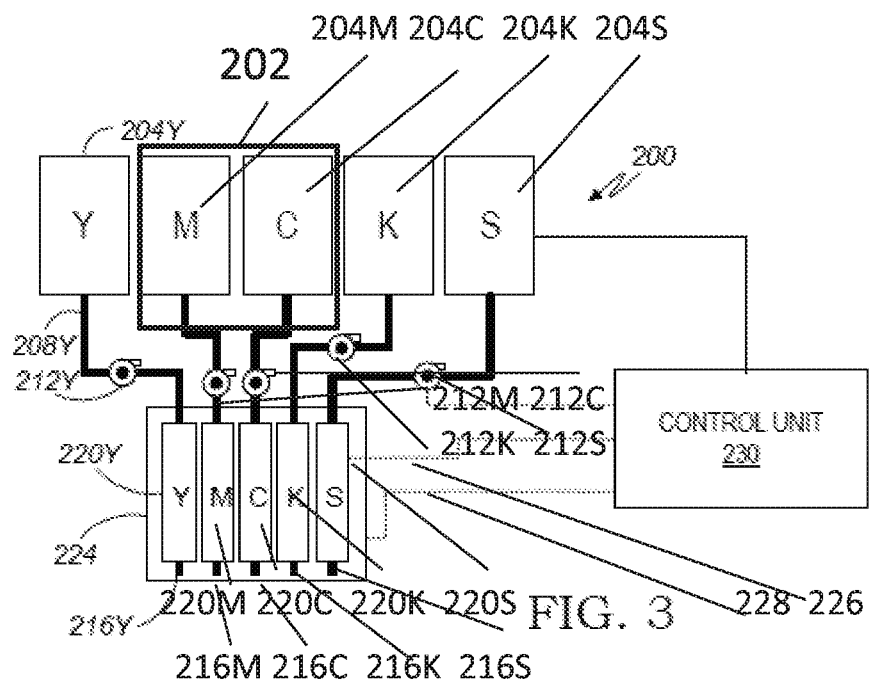
FIG. 3
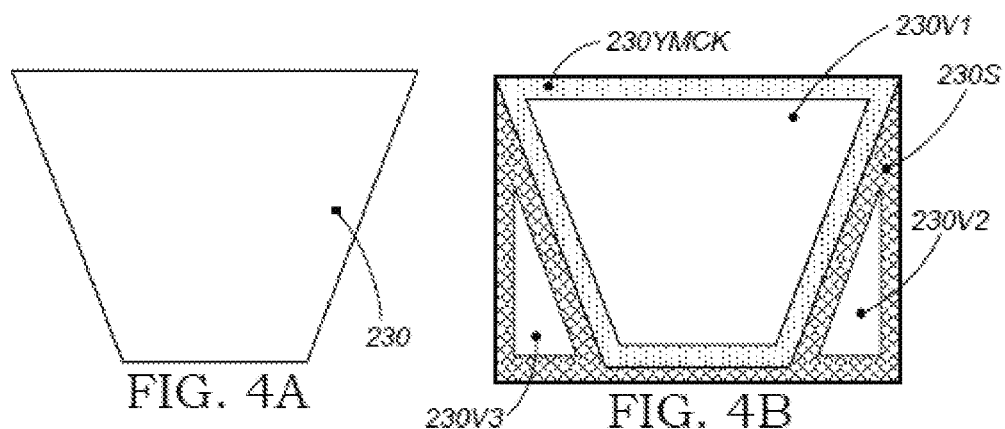
FIG. 4A
FIG. 4B
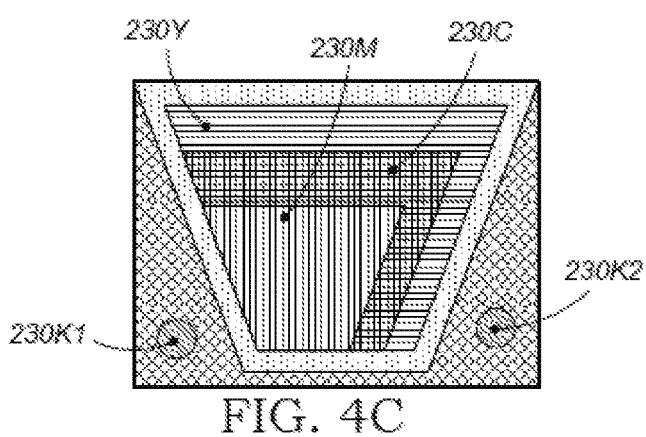
FIG. 4C

CONSUMPTION OF MATERIAL IN ADDITIVE MANUFACTURE

RELATED APPLICATIONS

This application is a National Phase of PCT Patent Application No. PCT/IL2016/051158 having International filing date of Oct. 27, 2016, which claims the benefit of priority under 35 USC § 119(e) of U.S. Provisional Patent Application No. 62/247,785 filed on Oct. 29, 2015. The contents of the above applications are all incorporated by reference as if fully set forth herein in their entirety.

FIELD AND BACKGROUND OF THE INVENTION

The present invention, in some embodiments thereof, relates to consumption of material during additive manufacture.

Additive manufacture, or 3D printing, generates 3D objects by printing successive layers of material one on top of the other. The materials used are defined according to the requirements of the objects being made. Some of the material is very strongly defined by the object requirements, whereas with some parts of the object there is some flexibility in the material that can be used. Furthermore, in additive manufacture, some of the material printed is not part of the object at all, but instead part of a scaffold to give parts of the object mechanical support during the course of manufacture.

Different materials have different shelf lives, and often certain materials have to be replaced unused, simply because they have reached their expiry dates. Sometimes materials run out in the middle of printing, so that the printing has to be stopped until a cartridge can be replaced. 3D printing is a process that takes several hours, so generally printers are left unsupervised. The operator may return hours later expecting to find the finished product but instead finding that the process was halted some time before pending cartridge replacement.

In general, material requirements are included in the product design, and the 3D printing software translates the requirements into the actual materials available at the printer. Sometimes the materials are tightly defined, as with design critical parts of the object being printed, and sometimes the materials are more loosely defined, allowing some leeway for the materials actually available to the individual printer.

Often material is supplied in combination packs, in which two or more materials are provided together. As soon as one of the materials runs out, the entire combination pack has to be replaced, just as in conventional printing where the entire color ink pack has to be replaced when the first color runs out.

SUMMARY OF THE INVENTION

The present embodiments attempt to balance consumption of materials during the course of manufacture. The material usage for the entire object is initially calculated and then a second calculation is made to exchange materials where possible in order to arrive at a more even consumption.

One possible element in the recalculation is to use the material packages or cartridges efficiently rather than have to replace entire packages just because one material is being used more heavily than others. Another element may relate to finishing up certain materials before they reach the end of their shelf life. Another element may relate to avoiding having to change cartridges during the current printing operation, and another element may relate to making effective and balanced use of the available materials in general, irrespective of whether they are available in combination cartridges or independent cartridges. The elements may more generally relate to avoiding waste or to avoiding inconvenience or both.

According to an aspect of some embodiments of the present invention there is provided a method for carrying out additive manufacture while regulating material consumption, the method comprising:

making a digital representation of at least part of an object for printing, the representation comprising a plurality of voxels;

identifying voxels which are flexible in respect of being able to consist of any one of at least two available materials;

obtaining a material consumption policy;

for the flexible voxels selecting one of the at least two available materials using the material consumption policy;

printing the plurality of voxels in the representation, wherein the flexible voxels are printed using the material selected according to the material consumption policy.

In an embodiment, the material consumption policy selects a material for a given voxel based on a function for balancing between different ones of the available materials.

In an embodiment, the material consumption policy selects a material for a given voxel based on a preference for using a material that is close to an expiry date.

In an embodiment, the material consumption policy selects a material for a given voxel in order to prevent any one of the available materials from running out prior to completion of a current printing task.

In an embodiment, a plurality of the available materials is provided together in a single combination cartridge, the material consumption policy selecting the material for a given voxel in such a way as to ensure balanced use of the materials provided together in the cartridge.

The method may comprise implementing the material consumption policy as a minimization of a cost function.

In an embodiment, the cost function applies a penalty to use of a given material beyond an average over the available materials.

In an embodiment, the cost function applies a penalty to use of a given material sharing a cartridge with at least one other given material, beyond an average of all materials sharing the cartridge.

In an embodiment, the cost function applies a penalty to use of materials in proportion to an amount of remaining shelf life, thereby to encourage use of materials having little remaining shelf life.

According to a second aspect of the present embodiments, there is provided additive manufacture apparatus with a plurality of available consumable materials, for carrying out additive manufacture while regulating material consumption, the apparatus comprising:

a printing control unit, the printing control unit comprising:

representation storage configured to hold a digital representation of at least part of an object for printing, the representation comprising a plurality of voxels;

a versatility identification unit configured to identify voxels which are flexible in respect of being able to consist of any one of at least two of the consumable materials;

policy storage configured to hold a material consumption policy; and a material selector for flexible voxels, the material selector configured to select one of the at least two available materials for each of the flexible voxels using the material consumption policy; and a printing unit connected to the printing control unit, and controllable to print the plurality of voxels in the representation, wherein the flexible voxels are printed using the material selected according to the material consumption policy.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions.

Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a simplified schematic block diagram illustrating apparatus for 3D printing using multiple materials and with controls for balancing the usage of the different materials according to embodiments of the present invention;

FIGS. 2A, 2B, 2C and 2D show four stages in the assignment of material to a 3D object being printed according to embodiments of the present invention;

FIG. 3 is a simplified schematic block diagram illustrating apparatus for 3D printing using multiple materials and with controls for balancing the usage of the different materials according to embodiments of the present invention;

FIGS. 4A, 4B and 4C show three stages in the assignment of material to a 3D object being printed according to embodiments of the present invention;

DESCRIPTION OF SPECIFIC EMBODIMENTS OF THE INVENTION

Figure 5:
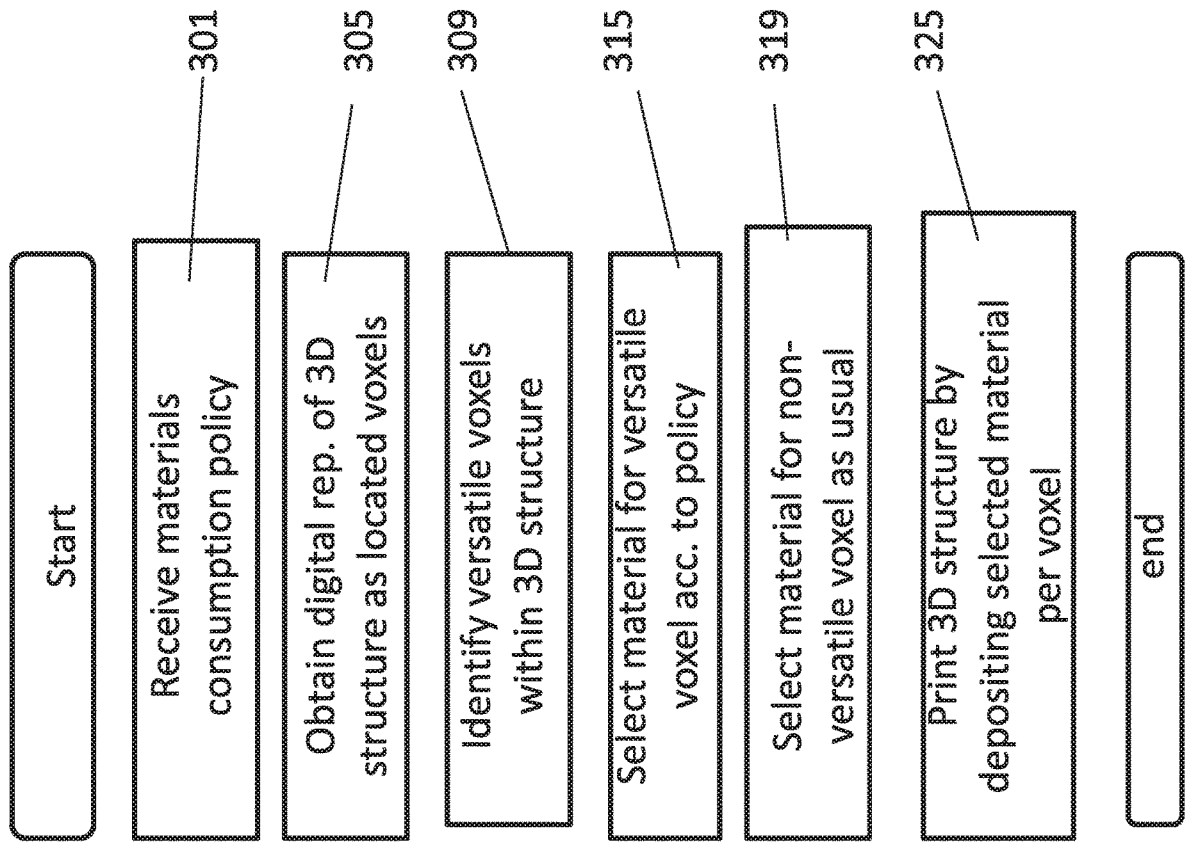
FIG. 5 is a simplified flow chart illustrating a procedure for assigning materials, balancing the assignment of materials and then printing a 3D object, according to embodiments of the present invention.

The present invention, in some embodiments thereof, relates to consumption of material during additive manufacture and, more particularly, but not exclusively, to a way of balancing between different materials so that supplies and supply packages can be used efficiently.

In general, plans for 3D printing specify materials. However not all printing machines have the same range of materials available, so plans may specify materials in terms of properties, leaving the specific printing machines to match the specification to the materials actually available at the machine.

Thus it may happen that the specification of a material is very specific, but it may also happen that the specification is more loose. Thus in some cases several materials on the particular machine may in fact qualify for a particular voxel, and in other cases only one material. The present embodiments may take advantage of the cases where the material is more loosely specified to select between the different materials in such a way as to balance overall usage of material at the printer. Typically material within the bulk is more loosely specified than materials at surface layers or materials used in layers having particular tasks in the product being printed.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 is a simplified diagram showing apparatus 100 according to an embodiment of the present invention for additive manufacture. The apparatus comprises printing material containers 104 A, B and S. Container 104 A is independent but containers B and S are in single cartridge 102. Container 104A feeds through pipe 108A and control valve 112A to printing reservoir 120A which is located in printing block 122. From printing reservoir 120A printing is carried out by spraying the substance via nozzle 116A.

Likewise containers B and S feed material through pipes 108B and 108S respectively and valves 112B and 112S to reservoirs 120B and 120S, and then printing is carried out by spraying through nozzles 116B and S.

Control unit 130 controls the printing head by controlling the valves 112 A . . . S through control lines 124 A . . . S. The print head is controlled via line 126A . . . S and the nozzles are controlled via control lines 128 A . . . S.

Reference is now made to FIGS. 2A to 2D, which show an object being planned according to the present embodiments. FIG. 2A shows the overall outline 140. FIG. 2B shows the initial representation of the object with regions 140A, 140B and 140S containing the materials A, B and S respectively. It is noted that relatively little of material A is used. Also more of material B is used than material S.

In FIG. 2C three regions are identified 140V1, 140V2 and 140V3, in which the voxel definitions allow for different materials to be used. FIG. 2D shows areas 140A1 and 140A2 where material S is substituted with material A. Area 140S1 is an area where material B has been substituted for material S. Thus the final version in FIG. 2D uses the different materials more evenly than the original version in FIG. 2B, and in particular finds a better balance between the B and S materials.

FIG. 3 is a simplified diagram showing apparatus 200 for additive manufacture according to an embodiment of the present invention. The apparatus comprises printing material containers 204 Y, M, C, K and S. Containers 204Y, K and S are independent but containers M and C are in a single cartridge 202. Container 204Y feeds through pipe 208Y and control valve 212Y to printing reservoir 220Y which is located in printing block 224. From printing reservoir 220Y printing is carried out by spraying the substance via nozzle 216Y. Container 204M feeds through pipe 208M and control valve 212M to printing reservoir 220M which is located in printing block 224. From printing reservoir 220M printing is carried out by spraying the substance via nozzle 216M. Container 204C feeds through pipe 208C and control valve 212C to printing reservoir 220C which is located in printing block 224. From printing reservoir 220C printing is carried out by spraying the substance via nozzle 216C. Container 204K feeds through pipe 208K and control valve 212K to printing reservoir 220K which is located in printing block 224. From printing reservoir 220K printing is carried out by spraying the substance via nozzle 216K. Finally, container 204S feeds through pipe 208S and control valve 212S to printing reservoir 220S which is located in printing block 224. From printing reservoir 220S printing is carried out by spraying the substance via nozzle 216S.

Control unit 230 controls the printing block 224 by controlling the valves 212 Y . . . S through control lines 226. The print heads 220Y, 220M, 220C 220$k$ and 220S are controlled via line 226 and the nozzles are controlled via control lines 228 It is noted that printing block 224 comprises multiple printing heads, one per reservoir 220Y . . . S, each jetting a different material, and optionally, more than one printing head may jet the same material.

Reference is now made to FIGS. 4A to 4C, which show an object being planned according to the present embodiments. FIG. 4A shows the overall outline 230. FIG. 4B shows the initial representation of the object with regions 230YMCK which requires a particular material selected from those available, 230S which requires material S, and 230V1, 230V2 and 230V3, which can each take at least two different materials or a mixture of materials quite happily. It is noted that the mixture of MYK approximately balances the material S and a large number of voxels have some freedom of choice. So the initial set of defined materials is fairly balanced but the undefined voxels make up most of the bulk, so the task is to make a balanced selection of materials over the undefined voxels.

FIG. 4C shows a solution in which the defined regions 230YMCK and 230S of FIG. 4B are retained and the undefined regions uses the different materials evenly to form a region 230Y, 230M, 230C and two K regions, 230K1 and 230K2.

Reference is now made to FIG. 5, which is a simplified flow chart that illustrates a method for carrying out additive manufacture while regulating material consumption according to embodiments of the present invention. Box 301 indicates that a material consumption policy is loaded. The policy defines how selections are made whenever a particular voxel could be manufactured from more than one material.

Box 305 relates to obtaining a digital representation of at least part of an object for printing. The representation is in the form of voxels.

Box 309 relates to the task of identifying those voxels in the design which are versatile in respect of being able to consist of more than one of the available materials. Each of these voxels adds one degree of freedom to the system for each material it can allow.

In box 315, for each versatile voxel, one of the allowed materials is selected using the material consumption policy. The policy generally relates to usage of the materials over the printing process as a whole and thus selects a material for the given voxel in view of the whole process.

In box 319 the defined materials are used for the remaining, non-versatile voxels.

Finally, box 325 relates to printing the object voxel by voxel using the representation and the selected material for each voxel.

Figure 6:
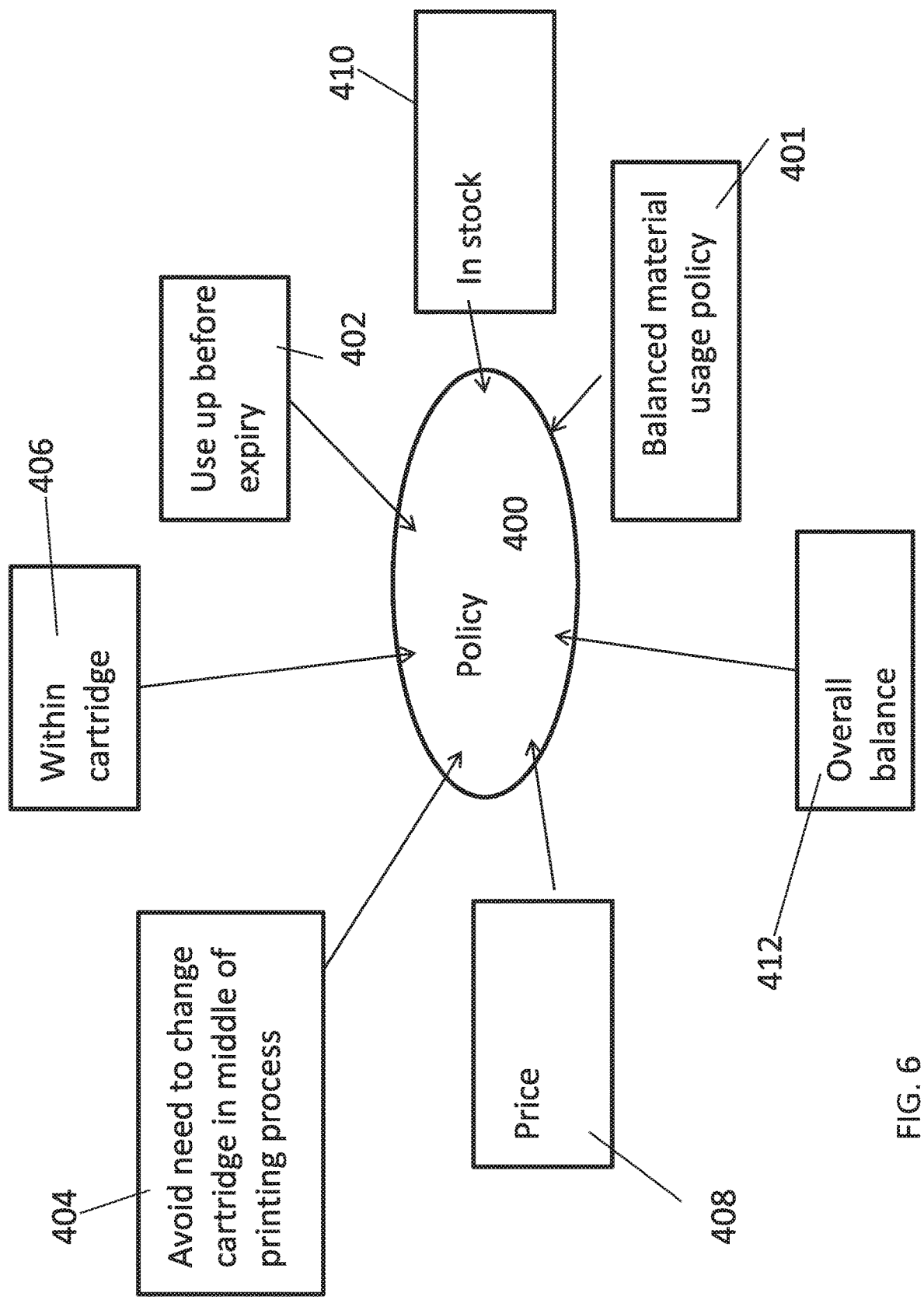
FIG. 6 is a simplified diagram illustrating elements of a balanced material usage policy according to embodiments of the present invention.

Reference is now made to FIG. 6, which is a simplified chart showing different elements of the policy and the interactions between the elements. The policy 400 has policy elements 401 . . . 412. As explained, the material consumption policy 401 selects a material for a given voxel based on a function for balancing between different available materials, under the proviso that the material selected is suitable. As indicated by box 402, the material consumption policy may choose between suitable materials and select that one of the suitable materials for a given voxel which is closest to its expiry date. In this way, material is preferentially used up before it ages, and does not need to be disposed of unused simply because it has aged.

Box 404 indicates that the material consumption policy selects a material for a given voxel in order to prevent any one of the available materials from running out prior to completion of a current printing task. That is to say, if there is only so much of material A, then the policy will try to ensure that the available amount or less is assigned to the current printing task, so that containers do not need to be changed in the middle of the task.

Box 406 is for the case where several materials are provided together in the same cartridge, that is to say they are provided in a combination cartridge. As explained, a problem with combination cartridges is that the whole cartridge has to be replaced when just one of the materials runs out. The policy thus tries to use the materials that go together in a single cartridge evenly.

Box 408 indicates price as an element in the policy, and cheaper materials can be selected in preference to more expensive materials when all are suitable.

Box 410 indicates issues to do with the material actually being in stock or specific policies that the user has with respect to particular materials. For example certain materials may be present in the printer but may not be available from storage or it may hard to obtain new orders. The policy can be set to use such materials sparingly.

Box 412 indicates overall balancing of the materials available in the product.

One way of implementing the material consumption policy 400 as shown in FIG. 6 is as a minimization of a cost function. For each of the elements in FIG. 6 a cost can be associated. Thus materials close to expiry can be given a lower cost than materials well away from expiry. Materials together in a cartridge can be given a higher cost when they are more heavily used than the other materials in the cartridge and a lower cost when more lightly used. The cost may be calculated against an average of the materials in the cartridge. A material that is close to running out may be given a high cost for any use beyond that which drains the supply. Finally, materials overall may be assigned an increased cost the more heavily used they are.

Figure 7:
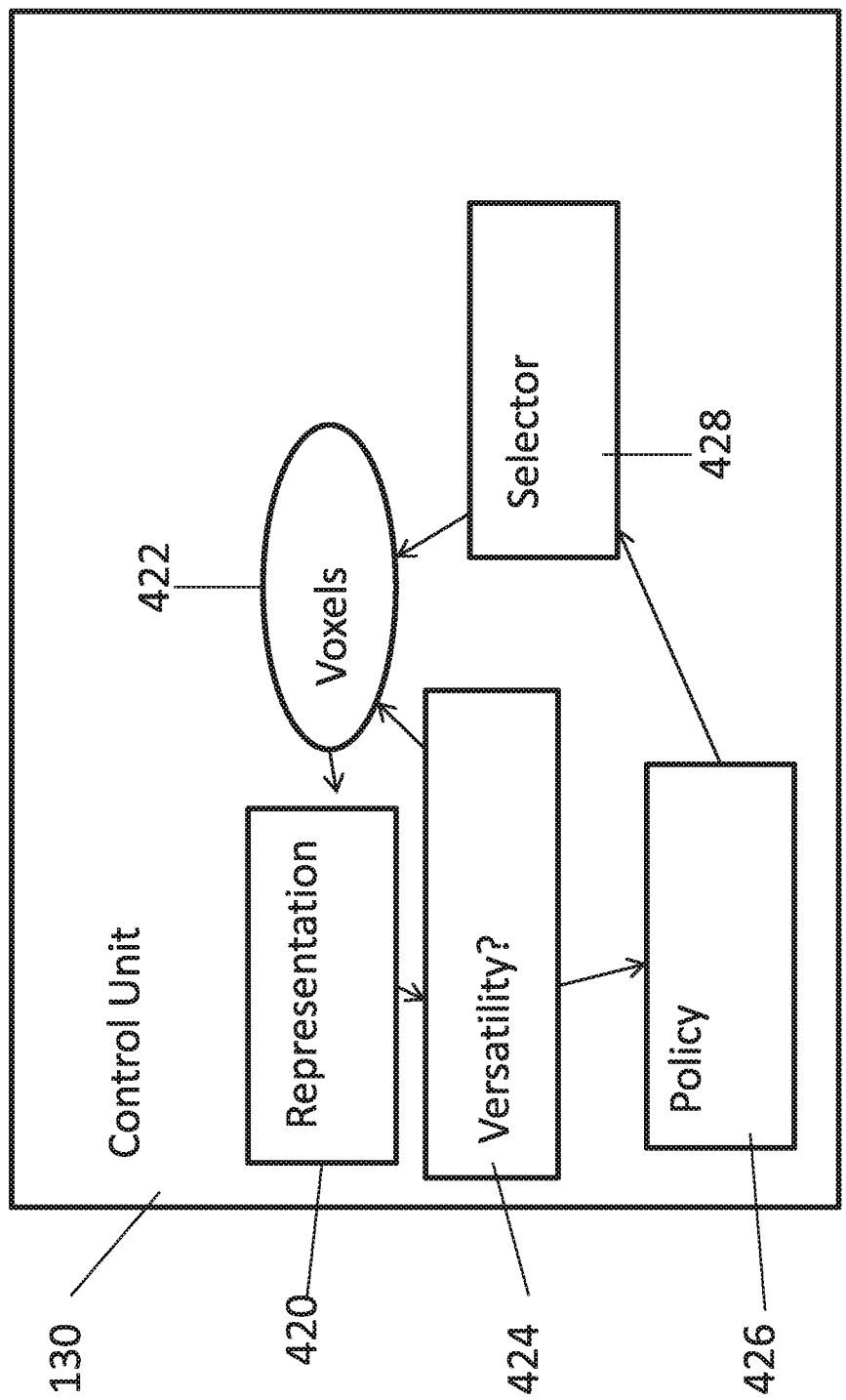
FIG. 7 is a simplified diagram illustrating in greater detail the control unit shown in FIGS. 1 and 3.

Reference is now made to FIG. 7, which is a simplified diagram illustrating in greater detail the control unit 130 (230). Control unit 130 operates the printing unit shown in FIGS. 1 and 3. The control unit 130 stores a representation of the object to be printed in representation memory unit 420. The representation is in the form of voxels 422 and each voxel is initially assigned a material in the normal way or determined to be flexible or versatile in the sense that more than one of the available materials meet the criteria for that voxel. Flexibility of the voxel is determined by versatility unit 424. If the unit is versatile then policy unit 426 is consulted. Material selector 428 then chooses between the available materials for the voxel using the policy.

It is expected that during the life of a patent maturing from this application many relevant additive manufacturing devices, techniques and materials will be developed and the scope of the terms used herein are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for additive manufacturing comprising:
obtaining a material consumption policy;
obtaining a digital representation of a three-dimensional (3D) structure, said digital representation comprising a plurality of voxels;
identifying, in said 3D structure, defined regions consisting of non-versatile voxels:
identifying, in said 3D structure, undefined regions consisting of versatile voxels;
selecting a consumable material for each of said non-versatile voxels;
selecting a consumable material for each of said versatile voxels according to said material consumption policy; and
printing said 3D structure, voxel by voxel, using said digital representation and said material selected for each of said plurality of voxels, wherein said consumption policy comprises applying a weighting to each one of said at least two available consumption materials, and said selecting a consumable material for each of said versatile voxels comprises minimizing a cost function associated with said weightings.

2. The method of claim 1, wherein said material consumption policy comprises selecting a consumable material for a versatile voxel so as to evenly balance the consumption between the different consumable materials during the course of manufacturing.

3. The method of claim 1, wherein said material consumption policy comprises selecting for a versatile voxel, the consumable material having the closest expiry date.

4. The method of claim 1, wherein said material consumption policy comprises selecting a consumable material for a versatile voxel so as to prevent any one of said consumable materials from running out prior to completion of a current printing task.

5. The method of claim 1, wherein a plurality of said consumable materials are provided together in a single combination cartridge, and wherein said material consumption policy comprises selecting a consumable material for a versatile voxel in such a way as to ensure balanced use of consumable materials provided together in said cartridge.

6. The method of claim 1, wherein said cost function applies a penalty for using a given consumable material beyond an average use of all consumable materials.

7. The method of claim 1, wherein said cost function applies a penalty for using a given consumable material sharing a cartridge with at least one other consumable material, beyond an average use of all consumable materials sharing said cartridge.

8. The method of claim 1, wherein said cost function applies a penalty for using a consumable material that is not the closest to its expiry date.

9. Additive manufacture apparatus comprising:
a plurality of consumable materials;
a printing control unit, the printing control unit comprising:
- a representation storage unit configured to hold a digital representation of a three-dimensional (3D) structure comprising a plurality of voxels;
- a versatility identification unit configured to identify defined regions consisting of non-versatile voxels and undefined regions consisting of versatile voxels wherein a consumable material for said versatile voxels may be selected from more than one of said consumable materials;
- a policy storage unit configured to hold a material consumption policy; and
- a material selector unit configured to select a material among the plurality of consumable materials for each of said non-versatile voxels and for each of said versatile voxels according to said material consumption policy; and a printing unit connected to said printing control unit, and controllable to print said 3D structure, voxel by voxel, based on said digital representation and said materials selected by said material selector unit, wherein said consumption policy comprises applying a weighting to each one of said at least two available consumption materials, and said selecting a consumable material for each of said versatile voxels comprises minimizing a cost function associated with said weightings.

10. The apparatus of claim 9, wherein at least two of said consumable materials share a cartridge.

11. The apparatus of claim 9, wherein said material consumption policy comprises selecting a consumable material for a versatile voxel so as to evenly balance the consumption between the different consumable materials during the course of manufacture.

12. The apparatus of claim 9, wherein said material consumption policy comprises selecting for a versatile voxel, the consumable material that is the closest to its expiry date.

13. The apparatus of claim 9, wherein said material consumption policy comprises selecting a consumable material for a versatile voxel in order to prevent any one of said consumable materials from running out prior to completion of a current printing task.

14. The apparatus of claim 9, wherein a plurality of said consumable materials are provided together in a single combination cartridge, and wherein said material consumption policy comprises selecting a consumable material for a versatile voxel in such a way as to ensure balanced use of said consumable materials provided together in said cartridge.

15. The apparatus of claim 9, wherein said material consumption policy comprises minimizing a cost function.

16. The apparatus of claim 15, wherein said cost function applies a penalty for using a given consumable material beyond an average use of all consumable materials.

17. The apparatus of claim 15, wherein said cost function applies a penalty for using a given consumable material sharing a cartridge with at least one other consumable material, beyond an average use of all consumable materials sharing said cartridge.

18. The apparatus of claims 15, wherein said cost function applies a penalty for using a consumable materials that is not the closest to its expiry date.

* * * * *